United States Patent [19]

Baenziger

[11] 4,285,476
[45] Aug. 25, 1981

[54] TOUCH CONTROL FOR A SPIN-CASTING REEL

[76] Inventor: Robert C. Baenziger, 115 Voltz Rd., Northbrook, Ill. 60062

[21] Appl. No.: 56,611

[22] Filed: Jul. 11, 1979

Related U.S. Application Data

[63] Continuation-in-part of Ser. No. 958,038, Nov. 6, 1978, abandoned.

[51] Int. Cl.³ .............................................. A01K 89/01
[52] U.S. Cl. ................................................ 242/84.2 A
[58] Field of Search ................... 242/84.2 A, 84.2 R, 242/84.2 E, 84.2 F, 84.21 A, 84.21 R

[56] References Cited

U.S. PATENT DOCUMENTS

| | | | |
|---|---|---|---|
| 2,652,990 | 9/1953 | Ferguson | 242/84.2 A |
| 2,675,193 | 4/1954 | Hull | 242/84.2 E |
| 2,854,200 | 9/1958 | Montgomery | 242/84.21 A |
| 2,929,578 | 3/1960 | Hull | 242/84.2 E |
| 3,029,400 | 4/1962 | Wood | 242/84.2 A |
| 3,041,002 | 6/1962 | Hull | 242/84.2 A |
| 3,176,930 | 4/1965 | Miller et al. | 242/84.2 A |
| 3,185,405 | 5/1965 | Hull | 242/84.2 A |

FOREIGN PATENT DOCUMENTS 1138215 12/1968 United Kingdom ............... 242/84.2 R Primary Examiner—Billy S. Taylor
Attorney, Agent, or Firm—Lockwood, Dewey, Alex & Cummings

[57] ABSTRACT

A touch control is provided for a spin-casting fishing reel employing a freewheeling flywheel adjacent the line-discharge end of a non-rotating line spool, which flywheel rotates freely of the line take-up or retrieval mechanism and engages with the line and spins as the line unwinds from the spool. A touch control member carried on the reel is operable by manual pressure to selectively retard rotation of the flywheel to control or feather line discharge from the reel.

11 Claims, 6 Drawing Figures

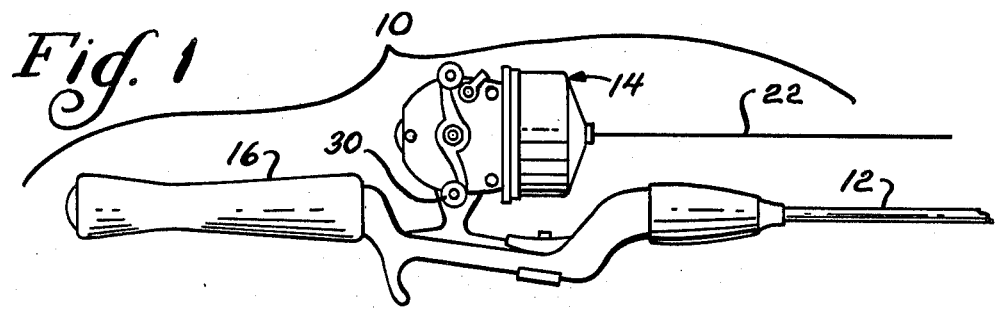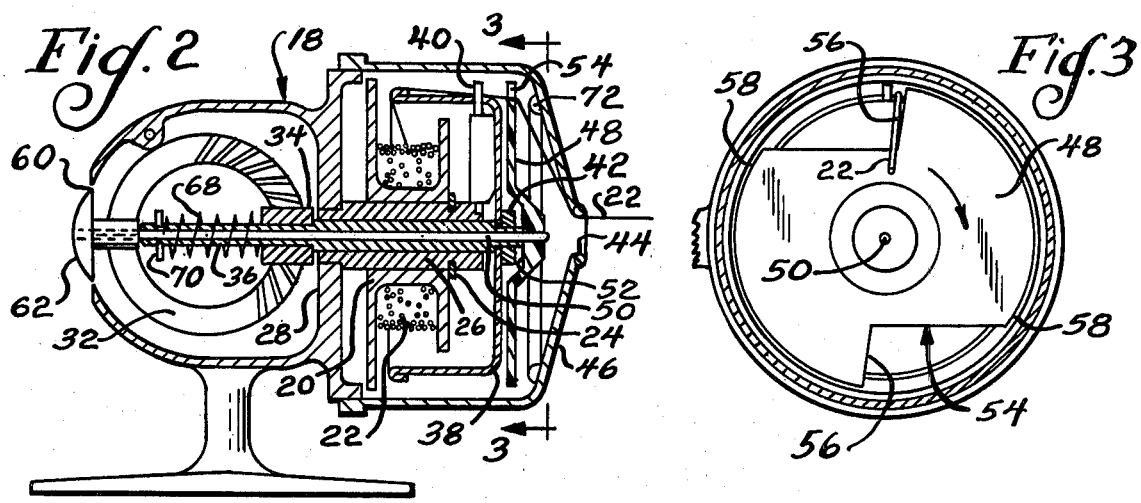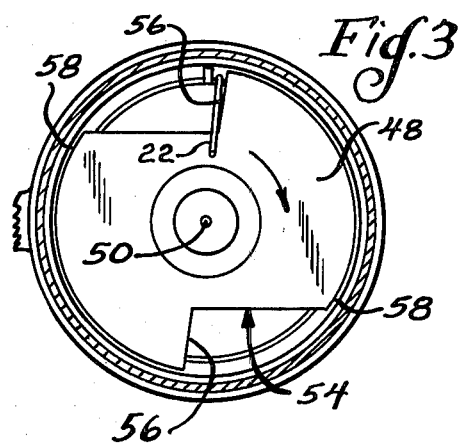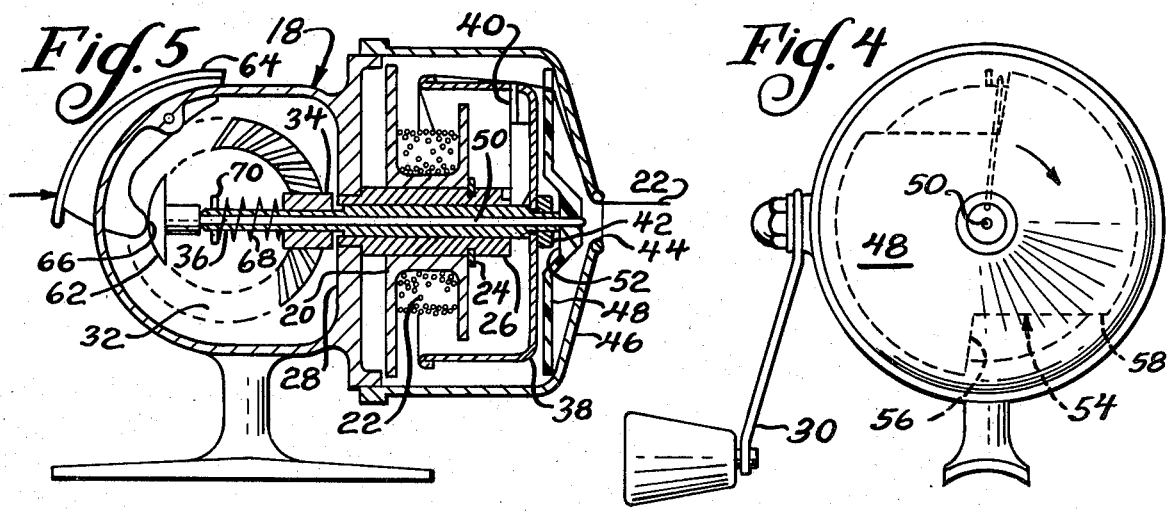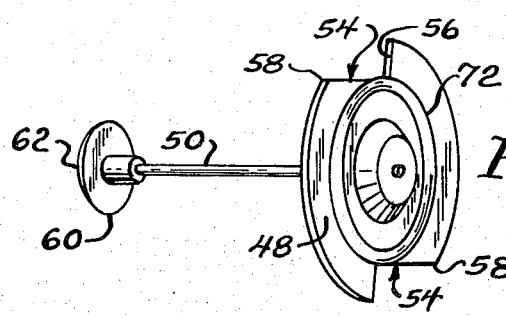

TOUCH CONTROL FOR A SPIN-CASTING REEL

This application is a continuation-in-part of co-pending U.S. patent application Ser. No. 958,038, filed Nov. 6, 1978 and now abandoned.

This invention generally relates to apparatus for controlling or feathering the discharge of line from the non-rotating spool of a spinning fishing reel of the type wherein line is permitted to freely discharge, as during casting, by unwinding in a generally axial direction about an open discharge end of the fixed spool.

While spin-casting reels are in widespread use, such reels do not appeal to many experienced fishermen because of the lack of feel between line, rod and reel during casting. This lack of connection or feel is due to the free unwinding of the line about the open-face or discharge end of the non-rotating spool during casting, and results in a lack of control over the distance or direction of the cast after the line is released and begins to freely unwind.

In U.S. Pat. No. 3,516,191, issued on June 23, 1970, entitled "Fishing Feel Wheel", there is disclosed a freewheeling flywheel for attachment to a fishing rig between the reel and the forward end of the rod for the purpose of improving the casting of bait and to give feel to where the bait is going. The flywheel is circumferentially enclosed, with openings for axial passage of the line from the reel to and from the flywheel for tangential winding and unwinding from a circumferential groove defined in the flywheel. While this prior invention satisfactorily performs its desired functions, it has not been an easily marketable item. In particular, since the flywheel is a separate attachment, its sales appeal is limited. Furthermore, the device embodies in that invention needs demontration to illustrate its function and effectiveness.

U.S. Pat. No. 2,675,193 shows an early, unsatisfactory attempt to provide line discharge control for a spin-casting reel. The reel in that patent uses a rotating skirt with peripheral line-engaging notches to retrieve the fishing line. During casting, the skirt is disengaged from the handle mechanism so that it can rotate as line discharges from the spool. A rotating control button, driven by the skirt is mounted behind the skirt and is accessible through an opening in a rear cover plate to control discharge by thumb contact. Casting with this reel, however, is not satisfactory because of the large amount of drag and inertia provided by the rotating skirt, line take-up mechanism, and shaft which must be rugged enough to wind in large fish and which also carries gears or the like for cooperation with the winding handle.

U.S. Pat. Nos. 3,222,010 and 2,929,578 and United Kingdom Pat. No. 1,138,215 show additional previously known fishing reel constructions. The object of the present invention generally stated, is to provide a spin-casting reel of the type having a non-rotating spool adapted to discharge line therefrom by unwinding in a generally axial direction to the spool about an open discharge end of the spool with an improved line discharge control which permits more precise casting.

Another object of the present invention is to provide such a spin-casting reel which includes a freewheeling flywheel as an integral part of the spinning reel, which flywheel rotates freely with respect to the line take-up or retrieval mechanism.

A further object of the present invention is to provide a manual control for selectively retarding the flywheel rotation to control or feather the discharge of line therefrom.

A still further object of the present invention is to provide a spincasting reel of the type described wherein the flywheel may be moved to lock the line completely against discharge without damaging the line.

These objects and advantages of the invention, and others, including those inherent in the invention, are accomplished by a freewheeling flywheel adapted to be rotatively mounted in a generally coaxial relationship to the non-rotating spool of a spinning fishing reel wherein line discharges as during casting by unwinding in a generally axial direction to the spool about the open discharge end of the spool. The freewheeling flywheel, rotates independently of any line take-up or retrieval mechanism, and preferabley is in the form of a disc of generally circular configuration mounted on one end of a central, freely rotating axle a shaft which extends through the spool shaft such that the disc is located at the discharge end of the spool. Recess means are transversely disposed in the disc at at least one circumferential position in the disc with the recess means adapted to slidably engage the line during discharge from the spool to cause rotation of the disc thereby controlling the discharge of line from the spool. The recess means preferably has an abutting edge in the unwinding direction of line from the spool for engagement of the line with the disc in the unwinding direction, but the periphery of the disc defines a continuous arcuate surface between the adjacent recess means in the winding direction of the line on the spool such that winding of the line need not cause rotation of the disc. The line therefore automatically engages the disc during unwinding and requires no special threading or hook-up of the line to the disc. A manually operative control member is also mounted on the reel to control, including precise feathering of, the discharge of line from the reel. The control member is preferably mounted on a common axle with the flywheel and freely rotates therewith. Control is provided by direct manual contact, e.g., thumb pressure, with the spinning control member or indirectly via movable button which engages the control member. The line may also be fully locked against discharge by depression of the control member, which shifts the flywheel forward to either pinch the line against the reel housing or to freeze the flywheel against the housing, which in turn prevents further unwinding of the line. Either embodiment prevents further line discharge without damage to the line itself.

The features of the present invention, which are believed to be novel and patentable, are set forth with particularity in the appended claims. The invention, together with the further advantages thereof can best be understood by reference to the following description taken in conjunction with the accompanying drawings in which like reference numerals identify like elements, and in which:

FIG. 1 is a side elevational view of a fishing rig, including a pole and a spinning reel of the type employing the present invention and having a non-rotating spool from which line discharges by freely unwinding over the discharge end of the spool.

FIG. 2 is a vertical sectional view of the reel of FIG. 1 embodying the present invention with the freewheeling flywheel in a line-release position.

FIG. 3 is a vertical sectional view taken along line 3—3 of FIG. 2, with the line receiving recesses in the flywheel slightly exaggerated.

FIG. 4 is a front elevational view of the reel of FIG. 1.

FIG. 5 is a vertical sectional view of a different embodiment of the reel of FIG. 1 with the freewheeling flywheel in a line-lock position.

FIG. 6 is a perspective view of the flywheel and control member mounted on a common shaft in accordance with one embodiment of the present invention.

The present invention is embodied in a fishing rig, generally at 10 in FIG. 1, including a pole 12 with a spin-casting reel 14 mounted thereon in the customary manner adjacent to a handle grip portion 16. Referring to FIG. 2, which more clearly illustrates the present invention, the reel 14 has a housing 18 enclosing a non-rotating spool 20, about which fishing line 22, e.g., monofilament, is wound.

The spool is axially mounted by a C-clip 24 on a non-rotative shaft 26 which is fixedly mounted to an internal rigid wall 28 of the housing 18. Line may be wound onto the spool by a crank handle 30 which is operatively connected by means of meshing gears 32 and 34 to cause rotation of a central line retrieval shaft 36 extending coaxially through the fixed shaft 26. The shaft 36 passes through the fixed shaft and the spool 20 without mechanical connection therebetween, to a line take-up mechanism, including a skirt 38 and a retractable line-engaging pin 40. The skirt is generally cup-shaped, with a generally radially directed front face with a rearwardly directed flange portion. It is axially mounted on the front end of the retrieval shaft 36 by a threaded nut 42. The pin 40 is retracted for casting, and employing a construction well known in the fishing reel art, movement of the crank handle 30 restores the pin 40 to the non-retracted position such that the pin will pick up the line 22 and begin winding of the line over the skirt 30 onto the spool 20. When the pin 40 is retracted, the line 22 can freely unwind from the spool 20, pass over the skirt 38 and discharge through an aperture 44 in the apex of cone-shaped annular front housing portion 46. Although a level winding mechanism is often not used on small open-casting reels, the skirt 38 is preferably of sufficient internal diameter to receive the spool 20 partially therein during axially oscillating movement of the skirt relative to the spool for level winding of the line 22 if desired.

In another type of reel, not shown here, but illustrated in U.S. Pat. No. 2,675,193, the line take-up mechanism does not use a retractable pin, but employs notches on the rearward edge of the skirt flange which engage the line for winding into the spool.

In accordance with the present invention a freewheeling flywheel 48 is rotatably mounted adjacent the skirt 38 in a coaxial position with respect to both the skirt and the spool 20. The flywheel is mounted at one end of a small central axle 50 which extends concentrically through the hollow line retrieval shaft 36 and is unattached thereto so that it rotates freely with respect to the winding mechanism.

The flywheel 48 is preferably in the shape of a disc of generally circular configuration and may have a central recessed hub portion 52 for close-fitting adjacent the face of the skirt 32, which helps prevent line from entangling therebetween. However, it will be appreciated to those skilled in the art that the advantages of the present invention can be achieved with other shapes or configurations than those illustrated or described herein.

In accordance with another aspect of the invention, at least one recess 54 is disposed transversely in the flywheel 48 at a generally circumferential position. FIGS. 3 and 4 illustrate the preferred embodiment of the invention wherein a plurality of slightly exaggerated recesses 54 in the flywheel 48 may be characterized as right angle recesses extending transversely across the periphery of the disc 48 such that the recesses 54 each define an upstanding line-engaging edge 56, with the edge 56 being along a radius of the disc 48. Upon casting, the line 22 freely unwinds from the spool 20 in the direction of the arrow in FIG. 3, the line will contact the periphery of the flywheel 48 and will automatically engage against one of the line-engaging edges 56 defined by the recesses 54. Discharge of the line 22 will thereafter begin to cause rotation of the flywheel 48 in the direction indicated by arrow, and the line 22 will remain engaged in the recess 54 as long as there is tension in the line and will discharge by slidably moving against and along the edge.

Many modifications and variations of the recess 54 will be apparent to those skilled in the art. For example, the flywheel 48 could alternatively be provided with teeth or projections rising from the surface thereof and cause operation of the flywheel 48 in substantially the same manner as presented above. Variations of the line-receiving recesses in the flywheel 48 may also include V-shaped recesses transversely disposed about the periphery of the flywheel 48 at an angle with respect to the radius for more securely slidably receiving and engaging the line 22 during discharge. The depth and size of the respective recesses 54, has been somewhat exaggerated in the drawings for illustration purposes. It will be readily appreciated that the recesses can be of many different sizes and configurations, including only slightly larger than the diameter of the line.

In the preferred embodiment of the invention, transverse recesses 54 are utilized such that the periphery of the flywheel 48 defines a continuous arcuate surface 58 between adjacent recesses 54. The arcuate surface 58 permits winding of the line back onto the spool 20 without necessarily causing rotation of the flywheel 48 in a direction reverse to that shown in FIG. 3. The arcuate surfaces 58 also permit the flywheel 48 to continue rotating in the unwinding direction immediately after casting of the bait is finished, as due to rotational inertia, without causing further payout of line 22 from the spool 20. That is, the flywheel 48 engages the line 22 while there is tension in the line due to casting, but upon release in the tension of the line at the end of the cast the arcuate surfaces 58 between the adjacent recesses 54 permit continued rotation of the flywheel 48 without affecting payout of line.

For positive engagement between the line 22 and the recesses 54, the diameter of the flywheel 48 is preferably larger than the line retrieval skirt 38. Because the line must pass through the central aperture 44 in the conical housing portion 46, the radially inward tension on the line during casting draws the line against the edge of the flywheel and into one of the peripheral recesses.

The flywheel 48 of the present invention can be fabricated from a wide variety of materials including metals and plastics by known manufacturing techniques. The diameter, thickness, and weight of the flywheel will be dependent upon a number of factors such as the diameter of the discharge end of the spool 20 and the internal geometry of the front housing portion 46. However, the mass of the flywheel is preferably kept very small to reduce the inertia of the flywheel and the friction forces arising when it rotates. In contrast to earlier reels, this prevents the flywheel from creating too much drag on the discharge of line from the reel, while simultaneously permitting increased "feel" for accurate casting of even light baits or lines. Accordingly, the flywheel is preferably made of lightweight plastic such as PVC, nylon, polyethylene or similar material such as aluminum.

To control the rotation of flywheel 48 and thus the discharge of line 22 from the spool 20, touch control means are provided which allow the fisherman to selectively retard or brake the rotation of the flywheel by manual pressure. In accordance with this aspect of the present invention, a contact member 60 is attached to the rearward end of the axle 50 upon which the flywheel 48 is mounted. As best seen in FIG. 6, the contact member is preferably of circular disc shape with a hemispherical contact surface 62. Because the contact member 60 is mounted on the same axle as the flywheel, it rotates with the flywheel.

Rotation of the flywheel 48 is retarded by applying friction to the contact member 60. This may be accomplished by providing an access opening on the rear portion of the reel housing 18 for direct manual contact, such as by the fisherman's thumb, as shown in FIGS. 1 and 2. Also, as illustrated in FIG. 5, a separate control button 64 may be pivotally mounted on the housing, with an arcuate contact surface 66 which may be moved into contact with the hemispherical surface 62 of the contact member 60. The greater the pressure applied to the contact member 60, the greater the frictional force and the more the rotation of the flywheel and the line discharge is retarded. This permits a delicate "feathering" action by the fisherman to more accurately place the bait during casting.

The rearward end of the line retrieval shaft 36 abuts the contact member 60, so that axial depression of the contact member causes the line retrieval shaft 36, skirt 38 and freely rotatable flywheel 48 to be moved against the biasing force of a spring 68 to a forward position, which locks the line 22 against discharge by either pinching it between the flywheel and the conical face 46 of the housing or freezing the flywheel against the housing which locks the line within one of the recesses and prevents further unwinding. This would be used, for example, to prevent line discharge during the backswing of the pole just before casting. The spring 68 extends axially over the line retrieval shaft 36 and is compressively positioned between line take-up gear 34, which is itself axially slidable over the shaft 36, and a retaining ring 70 fixed to shaft 36. This biases the retrieval shaft, along with the contact member 60 and flywheel 48 which rotates on the axle 50 within the retrieval shaft, to a line-release position where the flywheel and housing are spaced sufficiently far apart for line discharge therebetween.

To prevent damage to the line 22 by the pinching action of the flywheel 48 against the conical housing portion 46, a resilient O-ring 72 may be mounted on either the inside surface of the conical face as shown in FIG. 2, or on the flywheel itself, as shown in FIG. 6. This permits pinching of the line without cutting or abraiding. If an O-ring is employed, it is preferably mounted on the housing to keep flywheel inertia minimal.

An alternative for locking line against discharge, preferable to an O-ring, is shown in FIG. 5. If the flywheel 48 is of sufficiently large diameter, axial depression of the contact member causes the peripheral edge of the flywheel to tightly engage the inside surface of the conical housing portion 46. This freezes the flywheel against further rotation, and the line 22, which is engaged in one of the recesses 54 against further unwinding. Because the line is not actually pinched or crimped, no damage occurs.

Summarizing the operation of a reel embodying the present invention, prior to casting, the line 22 has been retrieved and the bait or line is just beyond the end of the pole 12. The fisherman depresses the contact member 60 or control button 64, which causes axial movement of the flywheel 48, either alone or in combination with the line retrieval skirt 38, to a forward position which locks the line against discharge either by pinching the line against resilient O-ring 72 or freezing the peripheral edge of the flywheel against the inside surface of the housing. As the pole is moved through the casting stroke, the control member or push button is released and line is permitted to unwind axially from the spool. During this time, the line pick up pin 40 is retracted. The discharging line passes over the edge of the skirt through the center aperture 44 in the conical housing portion 46. The freewheeling flywheel is positioned between the skirt 38 and the conical housing portion 46, and as the line unwinds, it engages edge 56 of one of the flywheel recesses 54, causing the flywheel to spin as the line discharges. The rotating flywheel alone provides a sufficient mechanical connection between the line and reel to give the fisherman a better "sense" or "feel" for where the bait is going, thus permitting more accurate casting.

To further control bait placement, e.g., when a cast is too long, line discharge may be retarded by slight pressure against the contact member 60, either directly or by the control button 64 which frictionally engages the contact member, to slow rotation of the flywheel 48, permitting a precise feathering and control of the line discharge.

The present invention has been described in terms of the preferred embodiment for the purpose of illustration, not limitation, and it will be understood that various changes and modifications may be made without departing from the spirit of the invention as defined in the following claims.

What is claimed is:

1. In a fishing reel of the type including a non-rotating spool adapted to discharge line therefrom by unwinding of the line in a generally axial direction from one end of the spool, a housing enclosing the spool and including an aperture axially aligned with the spool through which the line passes, and line take-up means including a rotating face mounted between the spool and the housing aperture and aligned axially therewith for winding line onto the spool, the improvement comprising, in combination:

a freely rotating axle extending from front to rear in said housing, said axle being coaxial and freely rotatable with respect to the spool and the rotating face of the line take-up means;

a lightweight disc-shaped flywheel coaxially mounted between the rotating face and the aperture on one end of said axle for free rotation therewith;

said flywheel including peripheral recesses comprising a line-engaging edge to engage the line during discharge from said spool to cause rotation of said flywheel; and touch control member mounted on the other end of said axle and accessible through said housing to selectively retard rotation of said flywheel to control the discharge of line from the spool by manual pressure;

said axle further being axially movable between a rearward position where said flywheel is spaced from said housing to permit line discharge through the aperture and a forward position where said flywheel engages the reel housing to prevent line discharge; and spring means normally biasing said axle to said rearward position.

2. In a fishing reel of the type including a non-rotating spool adapted to discharge line therefrom by unwinding line in a generally axial direction from one end of said spool, and line take-up means engageable with the line and rotatable around said spool for winding line onto said spool, the improvement comprising, in combination;

an axle member and means supporting said axle member in a generally coaxial relationship with respect to said spool and freely rotatable with respect to said spool and said line take-up means;

line engaging means mounted on said axle member adjacent said discharge end of said spool, said line engaging means including at least one distinct line engaging portion engageable with the line during discharge from said spool to cause rotation of said line engaging means and said axle member;

touch control means mounted on said axle member beyond the other end of said spool for rotation with said axle member and said line engaging means during line discharge, and operable upon frictional engagement to retard selectively rotation of said line engaging means to control the discharge of line from said spool.

3. A fishing reel in accordance with claim 2 wherein said line engaging means is a generally disc-shaped flywheel.

4. A fishing reel in accordance with claim 2 wherein said line engaging means has relatively low inertia so as not to substantially impair the discharge of line from the spool.

5. A fishing reel in accordance with claim 3 said distinct portion of said line engaging means comprising at least one recess adjacent the circumference of said disc.

6. A fishing reel in accordance with claim 3 further comprising a housing for surrounding said spool and said flywheel means, an aperture in said housing for discharge of line therethrough from said spool after engagement by said flywheel means, and wherein said axle member is also axially movable relative to the line spool and is operable upon depression of said touch control means to move said flywheel means between a forward position to pinch line against said housing to prevent discharge and, upon release of said touch control means, to a retracted position spaced from said housing to allow discharge of the line.

7. A fishing reel in accordance with claim 6 wherein one of said flywheel and said housing includes a resilient pinch ring for pinching the line to prevent discharge.

8. A fishing reel in accordance with claim 2 wherein said touch control means has a hemispherical contact surface accessible to direct tactile engagement for retarding rotation of the line engagement means.

9. A fishing reel in accordance with claim 2 further comprising a control button carried by said reel and movable to engage said touch control means to retard rotation of said member and said line engaging means.

10. A fishing reel in accordance with claim 6 wherein said flywheel extends beyond the periphery of said line take-up means.

11. A fishing reel in accordance with claim 10 wherein said flywheel means includes a peripheral edge portion to engage said housing.

* * * * *